United States Patent Office
3,583,985
Patented June 8, 1971

3,583,985
NITROIMIDAZOLYL NITRONES
Ronald E. Bambury and Hyun K. Kim, Ashland, Ohio, assignors to Richardson-Merrell Inc., New York, N.Y.
No Drawing. Filed Apr. 9, 1969, Ser. No. 814,857
Int. Cl. C07d 49/36
U.S. Cl. 260—240                          11 Claims

ABSTRACT OF THE DISCLOSURE

Novel nitroimidazolyl nitrones of the formula

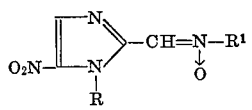

wherein R is (lower)alkyl or (lower)alkyl substituted by a hydroxyl group; and $R^1$ is alkyl of 1 to 8 carbon atoms or cycloalkyl of 5 to 8 ring carbon atoms which alkyl or cycloalkyl can be substituted with one or two hydroxyl, (lower)alkoxy or (lower)alkanoyloxy groups have been prepared. These compounds have antibacterial, antihistomonal, antifungal and antitrichomonal activity.

---

This invention relates to novel nitroimidazolyl nitrones of the formula

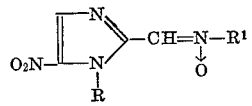

wherein R is (lower)alkyl or (lower)alkyl substituted by a hydroxyl group; and $R^1$ is alkyl of 1 to 8 carbon atoms, cycloalkyl of 5 to 8 ring carbon atoms, or said alkyl or cycloalkyl can be substituted with one or two hydroxyl, (lower)alkoxy or (lower)alkanoyloxy groups.

The term "(lower)" as used herein to modify alkyl, or derivatives thereof such as alkoxy, alkanoyloxy or hydroxyalkyl, relates to an alkyl grouping having from 1 to 4 carbon atoms. Illustrative of (lower)alkyls there can be mentioned: methyl, ethyl, propyl, butyl, isopropyl, and the like. Illustrative of hydroxy(lower)alkyls there can be mentioned 2-hydroxyethyl; 3-hydroxypropyl; 4-hydroxybutyl; 2-hydroxypropyl and the like. Illustrative of (lower)-alkoxy there can be mentioned: methoxy, ethoxy, 3-propoxy, 4-butoxy and the like. Illustrative of (lower)-alkanoyloxy groups there can be mentioned acetoxy, propionyloxy and the like. The alkyl or cycloalkyl groups of $R^1$ can be mono- or di-substituted with the aforesaid substituents.

Illustrative of cycloalkyls having from 5 to 8 carbon atoms there can be mentioned: cyclopentyl, cyclohexyl, cycloheptyl and cyclooctyl. Illustrative of alkyls having from 1 to 8 carbon atoms there can be mentioned the (lower)alkyls as well as pentyl, hexyl, heptyl and octyl. Illustrative of novel compounds of this invention there can be mentioned α-(1-methyl-5-nitroimidazol-2-yl)-N-methyl nitrone;
α-(1-methyl-5-nitroimidazol-2-yl)-N-ethyl nitrone;
α-(1-methyl-5-nitroimidazol-2-yl)-N-hexyl nitrone;
α-(1-ethyl-5-nitroimidazol-2-yl)-N-propyl nitrone;
α-(1-methyl-5-nitroimidazol-2-yl)-N-(2-hydroxyethyl)nitrone;
α-(1-methyl-5-nitroimidazol-2-yl)-N-(3-hydroxypropyl)nitrone;
α-(1-methyl-5-nitroimidazol-2-yl)-N-(2-acetoxyethyl)nitrone;
α-(1-methyl-5-nitroimidazol-2-yl)-N-(4-acetoxybutyl)nitrone;
α-(1-methyl-5-nitroimidazol-2-yl)-N-cyclohexyl nitrone;
α-(1-ethyl-5-nitroimidazol-2-yl)-N-cyclohexyl nitrone;
α-(1-methyl-5-nitroimidazol-2-yl)-N-(2-ethoxyethyl)nitrone;
α-(1-methyl-5-nitroimidazol-2-yl)-N-(4-ethoxybutyl)nitrone;
α-[1-(2-hydroxyethyl)-5-nitroimidazol-2-yl]-N-butyl nitrone;
α-[1-(2-hydroxyethyl)-5-nitroimidazol-2-yl]-N-hexyl nitrone;
α-(1-ethyl-5-nitroimidazol-2-yl)-N-(1,3-dihydroxy-2-propyl)nitrone;
α-(1-ethyl-5-nitroimidazol-2-yl)-N-(3,4-dihydroxy-1-butyl)nitrone;
α-[1-(3-hydroxypropyl)-5-nitroimidazol-2-yl]-N-ethyl nitrone;
α-(1-methyl-5-nitroimidazol-2-yl)-N-(4-hydroxycyclohexyl)nitrone;
α-(1-methyl-5-nitroimidazol-2-yl)-N-(2,4-dihydroxycyclohexyl)nitrone; and the like.

The closest prior art known to applicants appears to be Belgian Pat. 661,262 and what appears to be its corresponding Netherlands patent publication 6,503,442, which disclose certain derivatives of 2-formyl-5-nitro-1-methyl imidazole. Additional prior art includes British Pat. 1,105,007 which discloses nitrofuryl nitrones.

The compounds of this invention can be prepared by reacting a 1-substituted 2-formyl-5-nitroimidazol with a hydroxylamine as shown in Equation I:

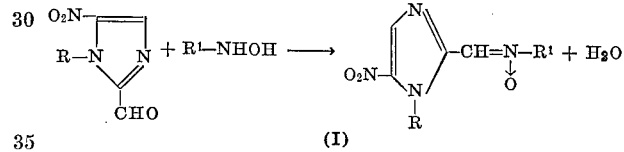

(I)

In the above Equation I, the substitutents R and $R^1$ have the same meaning as previously described. The hydroxylamine of the above Equation I, one-half to three molar equivalents, is mixed and reacted with one molar equivalent of the formyl nitroimidazole. The reaction is preferably conducted in an inert organic solvent such as an alcohol, benzene, toluene, dioxane, chloroform, methylene chloride, carbon tetrachloride, ether and the like to produce the subject nitrones.

The temperature of the reaction mixture is maintained at approximately −10° C. to +150° C., preferably at about 15° C. to 100° C., for about 0.1 to 48 hours. The course of the reaction may be followed by standard analytical techniques such as gas-liquid chromatography, thin-layer chromatography, ultra violet absorption, nuclear magnetic resonance and the like so that the reaction may be worked up when the concentration of the desired nitrone reaches a maximum.

In some instances the use of a Dean-Stark type water separation apparatus is useful in the promotion of the completion of the reaction by removal of the water as it is formed. An inorganic drying agent (magnesium sulfate, sodium sulfate, etc.) or molecular sieves may also be used for the same purpose. When the acid addition salt of the hydroxylamine is used as a reactant it may be desirable to use a mild base such as sodium bicarbonate, sodium acetate, barium hydroxide and the like to promote the reaction.

After the reaction is complete the nitrone product is recovered from the reaction mixture by the usual techniques (filtration, evaporation of the solvent, distillation, trituration, etc.) and the product can usually be further purified by recrystallization.

The reactant hydroxylamines of Equation I, used to prepare the nitrones of this invention are prepared by standard methods such as reduction of the corresponding nitro compounds, hydrolysis of nitrones, reduction of oximes, oxidation of amines, etc. These methods have been doucmented in: The Chemistry of Open Chain Organic Nitrogen Compounds, vol. II, chapter 8, by P. A. S. Smith, published by W. A. Benjamin, Inc., New York (1966). The preparation of the 1-substituted 2-formyl-5-nitroimidazoles has been described in a Netherlands Pat. No. 6,503,442.

The compounds of this invention can be employed as the active antibacterial and antifungal agent of disinfectant compositions for the control of microorganisms such as: *Salmonella typhimurium; Escherichia coli; Bacillus subtilis; Staphylococcus aureus; Candida albicans*; and the like. For disinfectant use, e.g., disinfection of surgical instruments, animal watering troughs, animal cages, etc., the nitrones of this invention can be dispersed in an inert finely divided solid and employed as a dust in concentrations of about 0.01% to 5%, preferably about 0.1% to 3% by weight of inert finely divided solids; or they can be dispersed in water or oil with or without a wetting, dispersing or emulsifying agent in concentrations which can vary over a wide range such as that of about 0.05% to 5%, preferably about 0.1% to 3% by weight of the liquid composition to prepare germicidal suspensions or emulsions which can be used, e.g., by spraying or dipping, to inhibit the growth of microorganisms.

For in vivo use in the inhibition of bacteria, or protozoa, the compounds of this invention can be administered to animals, e.g., warm-blooded animals such as chickens and turkeys, in quantities varying from about 20 to 200 mg./kg. of animal weight per day. Administration can be by conventional routes such as parenterally or orally, e.g., in tablets, capsules or in admixture with the animal's water or feed. When admixed with animal feed or water, the concentration of the compounds of this invention can vary from about 0.005% to 1% by weight of the animal's water or feed. Oral unit dosage forms can include tablets, capsules, powder packets, liquid suspensions, etc. Such dosages can contain from about 50 mg. (milligrams) to 500 or more mg. of the novel nitrone together with conventional carriers, e.g., lactose, corn starch, gelatin, peanut oil, and the like.

The following examples are illustrative of the invention.

EXAMPLE 1

Preparation of α-(1-methyl-5-nitroimidazol-2-yl)-N-(2-hydroxyethyl)nitrone

A mixture of 2.2 g. 2-formyl-1-methyl-5-nitroimidazole, 1.7 g. of 2-hydroxyethylhydroxylamine oxalate, 1.2 g. of sodium bicarbonate and 100 ml. of ethanol was stirred at room temperature for 18 hours. The mixture was filtered and the filter cake washed with 90 ml. of warm nitromethane. The filtrate and washings were combined and evaporated to give 1.8 g. of crude nitrone, M.P. 147–154°. The crude material was recrystallized from nitromethane to give 1.6 g. of α-(1-methyl-5-nitroimidazol-2-yl)-N-(2-hydroxyethyl)nitrone, M.P. 159–161°.

*Analysis.*—Calcd. for $C_7H_{10}N_4O_4$ (percent): C, 39.25; H, 4.71; N, 26.16. Found (percent): C, 39.38; H, 4.62; N, 26.13.

EXAMPLE 2

Preparation of α-(1-methyl-5-nitroimidazol-2-yl)-N-methyl nitrone

To a solution of 0.5 g. 2 - formyl-1-methyl-5-nitroimidazole in 25 ml. of ethanol was added 0.3 g. N-methylhydroxylamine hydrochloride and 0.3 g. sodium bicarbonate. The mixture was heated at the reflux temperature for two hours and filtered. The filtrate was evaporated to a volume of approximately 5 to 10 ml. and then cooled. The yellow crystals which formed were collected by filtration giving a yield of 0.8 g. of α-(1-methyl-5-nitroimidazol-2-yl)-N-methyl nitrone, M.P. 184–185°.

*Analysis.*—Calcd. for $C_6H_8N_4O_3$ (percent): C, 39.13; H, 4.38; N, 30.43. Found (percent): C, 39.25; H, 4.37; N, 30.52.

EXAMPLE 3

Preparation of α-(1-methyl-5-nitroimidazol-2-yl)-N-(2-acetoxyethyl)nitrone

A mixture of 1.6 g. 1-methyl-2-formyl-5-nitroimidazole, 1.8 g. N-(2-acetoxyethyl)hydroxylamine oxalate, 1 g. sodium bicarbonate and 25 ml. of ethanol was refluxed for three hours. A small amount of charcoal was added and the mixture was heated to the boiling point. The hot reaction mixture was filtered and the filter cake washed with a few ml. of warm ethanol. The filtrate and washings were combined and the solution evaporated. The residue was crystallized three times from benzene to give an analytical sample of α-(1-methyl-5-nitroimidazol-2-yl)-N-(2-acetoxyethyl)nitrone, M.P. 120–123°.

*Analysis.*—Calcd. for $C_9H_{12}N_4O_5$ (percent): C, 42.19; H, 4.72; N, 21.87. Found (percent): C, 42.10; H, 4.68; N, 21.90.

This compound may also be readily prepared by treatment of α-(1-methyl-5-nitroimidazol-2-yl)-N-(2-hydroxyethyl)nitrone with acetic anhydride in a typical esterification procedure.

EXAMPLE 4

Preparation of α-(1-methyl-5-nitroimidazol-2-yl)-N-cyclohexyl nitrone

A solution containing 0.5 g. 2-formyl-1-methyl-5-nitroimidazole and 0.37 g. of N-cyclohexyl hydroxylamine was heated at the reflux temperature for three hours. The solution was then evaporated and the yellow residue recrystallized from isopropyl alcohol to give 1.1 g. of α-(1-methyl - 5 - nitroimidazol-2-yl)-N-cyclohexyl nitrone, M.P. 154–156°. A second recrystallization of the nitrone from isopropyl alcohol gave an analytical sample, M.P. 155.5–157°.

*Analysis.*—Calcd. for $C_{11}H_{16}N_4O_3$ (percent): C, 52.37; H, 6.39; N, 22.21. Found (percent): C, 52.33; H, 6.40; N, 22.23.

EXAMPLE 5

Preparation of α-(1-methyl-5-nitroimidazol-2-yl)-N-(2-ethoxyethyl)nitrone

A mixture of 1.0 g. of 2-formyl-1-methyl-5-nitroimidazole, 1.0 g. N-(2-ethoxyethyl)hydroxylamine oxalate, 1.0 g. of sodium bicarbonate and 50 ml. of ethanol was heated under reflux for two hours. The mixture was filtered while hot and the volume of filtrate reduced to about 20 ml. On cooling the filtrate 1.1 g. of yellow crystals were obtained, M.P. 102–105°. Recrystallization of the product from ethanol gave an analytical sample of α-(1-methyl - 5 - nitroimidazol-2-yl)-N-(2-ethoxyethyl) nitrone, M.P. 103–104°.

*Analysis.*—Calcd. for $C_9H_{14}N_4O_4$ (percent): C, 44.62; H, 5.83; N, 23.13. Found (percent): C, 44.56; H, 5.83; N, 23.14.

EXAMPLE 6

Preparation of α-[1-(2-hydroxyethyl)-5-nitroimidazol-2-yl]-N-butyl nitrone

The compound is prepared as described in Example 1 by treating 2-formyl-1-(2-hydroxyethyl)-5-nitroimidazole with N-butylhydroxylamine hydrochloride in ethanol in the presence of sodium acetate.

EXAMPLE 7

Preparation of α-(1-ethyl-5-nitroimidazol-2-yl)-N-(1,3-dihydroxy-2-propyl)nitrone Treatment of 2-formyl-1-ethyl-5-nitroimidazole with N-(1,3 - dihydroxy-2-propyl)hydroxylamine hydrochloride and sodium bicarbonate according to the procedure described for Example 1 yields α-(1-ethyl-5-nitroimidazol-2-yl)-N-(1,3-dihydroxy-2-propyl)nitrone.

EXAMPLE 8

Preparation of α-(1-butyl-5-nitroimidazol-2-yl)-N-(4-propoxybutyl)nitrone

This compound is prepared by reacting N-(4-propoxybutyl)hydroxylamine oxalate with 1-butyl-2-formyl-5-nitroimidazole in alcohol in the presence of sodium bicarbonate according to the procedure outlined in Example 1.

EXAMPLE 9

Preparation of α-[1-(3-hydroxypropyl)-5-nitroimidazol-2-yl]-N-cyclooctyl nitrone Refluxing a benzene solution of N-cyclooctyl hydroxylamine and 2-formyl-1-(3-hydroxypropyl)-5-nitroimidazole in a flask fitted with a Dean-Stark water separator until the theoretical amount of water is collected gives the crude nitrone upon evaporation of the solvent.

EXAMPLE 10

In vitro biological activity of several of the compounds of the invention is illustrated in this example. The activity was determined by culturing the microorganism in tripticase soy broth in the presence of the nitrone at a concentration of one ten-thousandth of a gram per milliliter. The numbers at the left of the table correspond to the number of the example describing the preparation of the compound tested.

| Nitrone | ST | SA | BS | EC | CA |
|---|---|---|---|---|---|
| 1 | − | − | − | − | − |
| 2 | − | − | − | − | + |
| 3 | − | − | − | − | + |
| 4 | − | − | + | − | + |
| 5 | + | + | − | + | − |

The minus (−) signs indicate complete inhibition of the growth of the organism and the plus (+) signs indicate that the presence of the compound did not inhibit the growth of the organism. The meanings of the other abbreviations are: ST for *Salmonella typhimurium*; SA for *Staphylococcus aureus*; BS for *Bacillus subtilis*; EC for *Escherichia coli*; CA for *Candida albicans*.

EXAMPLE 11

This example shows the in vivo activity of α-(1-methyl-5-nitroimidazol-2-yl)-N-(2-hydroxyethyl)nitrone, hereinafter referred to as the Test Drug.

Test mice weighing 19–21 g. were used in the test. Groups of 10 mice per group were allowed free access to feed containing various quantities of the Test Drug from .025% by weight of the feed to .0063%. The mice are injected intraperitoneally with 0.2 ml. of a 1:100,000 dilution of a *Salmonella choleraesuis* strain Kunzendorf (ATCC No. 12011) brain heart infusion broth culture. Mortality records were maintained for 14 days post-infection with the mice receiving the test drug throughout this period. At the completion of the test, percent survival and milligram per kilogram dose corresponding to each level or quantity of drug in the feed were calculated. The feed, apart from the test drug, had an analysis of 24% minimum of crude protein, 4% minimum of crude fat, and 4.5% maximum of crude fiber. The feed contained: animal liver meal, fish meal, dried whey, corn and wheat flakes, ground yellow corn, ground oat groats, dehulled soybean meal, wheat germ meal, wheat middlings, cane molasses, dehydrated alfalfa meal, soybean oil, brewers dried yeast, vitamin A palmitate, irradiated dried yeast (source of vitamin $D_2$), riboflavin, niacin, calcium pantothenate, choline chloride, D-activated animal sterol, a-tocopherol, thiamine hydrochloride, menadione sodium bisufite (source of vitamin K activity), dicalcium phosphate, salt and traces of: manganous oxide, copper sulfate, iron carbonate, potassium iodate, cobalt sulfate and zinc oxide. The results of this test are shown in the following table wherein 10 mice were used at each level (concentration).

| | Average mg./kg. dose | Percent survival |
|---|---|---|
| Percent level of test drug in the feed: | | |
| 0.025 | 58.3 | 50 |
| 0.0125 | 31.0 | 20 |
| 0.00 | 0 | 0 |

What is claimed is:
1. A compound of the formula

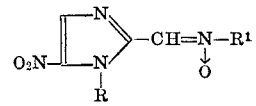

wherein:
 (A) R is (lower)alkyl or hydroxy(lower)alkyl;
 (B) $R^1$ is alkyl of 1 to 8 carbon atoms, cycloalkyl of 5 to 8 ring carbon atoms, hydroxyalkyl of 1 to 8 carbon atoms, (lower)alkyloxyalkyl of 1 to 8 carbon atoms in the oxyalkyl group, (lower)alkanoyloxyalkyl of 1 to 8 carbon atoms in the oxyalkyl group, hydroxycycloalkyl of 5 to 8 ring carbon atoms, (lower)alkoxycycloalkyl of 5 to 8 ring carbon atoms, (lower)alkanoyloxycycloalkyl of 5 to 8 ring carbon atoms, di(hydroxy)alkyl of 1 to 8 carbon atoms, di[(lower)alkyloxy]alkyl of 1 to 8 carbon atoms in the oxyalkyl group, di[(lower)alkanoyloxy]alkyl of 1 to 8 carbon atoms, di(hydroxy)cycloalkyl of 5 to 8 ring carbon atoms, di[(lower)alkoxy]cycloalkyl of 5 to 8 ring carbon atoms or di[(lower)alkanoyloxy]cycloalkyl of 5 to 8 ring carbon atoms.

2. A compound of claim 1 wherein R is (lower)alkyl and $R^1$ is alkyl.

3. A compound of claim 2 wherein each of R and $R^1$ is methyl.

4. A compound of claim 1 wherein R is (lower)alkyl and $R^1$ is hydroxyalkyl.

5. A compound of claim 4 wherein R is methyl and $R^1$ is 2-hydroxyethyl.

6. A compound of claim 1 wherein R is (lower)alkyl and $R^1$ is (lower)alkanoyloxyalkyl.

7. A compound of claim 6 wherein R is methyl and $R^1$ is 2-acetoxyethyl.

8. A compound of claim 1 wherein R is (lower)alkyl and $R^1$ is (lower)alkyloxyalkyl.

9. A compound of claim 1 wherein R is (lower)alkyl and $R^1$ is cycloalkyl.

10. A compound of claim 1 wherein R is hydroxy(lower)alkyl and $R^1$ is alkyl.

11. A compound of claim 1 wherein R is hydroxy(lower)alkyl and $R^1$ is hydroxyalkyl.

References Cited

UNITED STATES PATENTS 3,515,728   6/1970   Henry et al. _____ 260—309

JOHN D. RANDOLPH, Primary Examiner

G. T. TODD, Assistant Examiner

U.S. Cl. X.R.

260—309; 424—273; 99—2, 4